United States Patent
Norman et al.

(10) Patent No.: US 7,325,356 B2
(45) Date of Patent: Feb. 5, 2008

(54) MECHANICAL NETTING DEVICE

(76) Inventors: David R. Norman, 2481 Donegal Ct., West Linn, OR (US) 97068; David F. Norman, 2481 Donegal Ct., West Linn, OR (US) 97068

( * ) Notice: Subject to any disclaimer, the term of this patent is extended or adjusted under 35 U.S.C. 154(b) by 0 days.

(21) Appl. No.: 11/376,644

(22) Filed: Mar. 14, 2006

(65) Prior Publication Data

US 2006/0156610 A1    Jul. 20, 2006

Related U.S. Application Data

(63) Continuation-in-part of application No. 10/890,618, filed on Jul. 12, 2004, now abandoned.

(51) Int. Cl.
*A01K 74/00* (2006.01)
*A01K 77/00* (2006.01)
*B63C 9/00* (2006.01)

(52) U.S. Cl. .......................... 43/8; 43/6.5; 43/7; 43/11; 441/80

(58) Field of Classification Search .............. 43/5, 43/6.5, 7, 8, 11, 12, 102; 441/80; 114/255, 114/365; 414/462, 466, 921; 4/560.1, 564.1, 4/565.1, 566.1
See application file for complete search history.

(56) References Cited

U.S. PATENT DOCUMENTS

| | | | | |
|---|---|---|---|---|
| 194,123 A * | 8/1877 | Bourke | ........................ | 114/373 |
| 208,360 A * | 9/1878 | Bamber | ........................ | 441/86 |
| 1,053,608 A * | 2/1913 | Keepfer | ........................ | 43/12 |
| 1,130,528 A * | 3/1915 | McGray | ........................ | 441/80 |
| 1,388,414 A * | 8/1921 | Pieter Dros | ................... | 43/6.5 |
| 1,475,290 A * | 11/1923 | Ellison et al. | .............. | 114/365 |
| 1,532,367 A * | 4/1925 | Bockman | ........................ | 43/7 |
| 1,822,120 A * | 9/1931 | Douglas | ...................... | 114/365 |
| 2,289,592 A * | 7/1942 | Riedi | ................................ | 43/7 |
| 2,314,633 A * | 3/1943 | Riedi | ................................ | 43/7 |
| 2,548,038 A * | 4/1951 | Moliskey | ....................... | 43/6.5 |
| 2,557,079 A * | 6/1951 | Cutri | ................................ | 43/7 |
| 2,645,874 A * | 7/1953 | Collins | ........................... | 43/12 |
| 2,834,138 A * | 5/1958 | Pedersen | ....................... | 43/11 |
| 3,031,789 A * | 5/1962 | Edgington | ..................... | 43/11 |
| 3,091,879 A * | 6/1963 | Puretic | .......................... | 43/6.5 |
| 3,138,890 A * | 6/1964 | Mitchell | ......................... | 43/6.5 |
| 3,536,023 A * | 10/1970 | Bascom et al. | ............. | 114/259 |
| 3,635,441 A * | 1/1972 | Haines | ............................ | 43/8 |
| 3,791,625 A * | 2/1974 | Viljoen | ............................ | 43/8 |
| 3,793,760 A * | 2/1974 | Puretic | ............................ | 43/8 |
| 3,831,311 A * | 8/1974 | Cushing | ....................... | 43/6.5 |
| 3,852,908 A * | 12/1974 | Christopher | ................. | 43/102 |

(Continued)

FOREIGN PATENT DOCUMENTS

DE    19919510 A1 * 11/2000

(Continued)

*Primary Examiner*—Darren W. Ark
(74) *Attorney, Agent, or Firm*—Marger Johnson & McCollom, P.C.

(57) ABSTRACT

A motor-driven mechanical netting device includes a net assembly, a slide assembly, a bracket, and a mount. The slide assembly is structured to support the net assembly and includes a guide bar. The bracket is structured to support the net assembly, the slide assembly, and a motor. The mount is structured to support the bracket.

17 Claims, 6 Drawing Sheets

U.S. PATENT DOCUMENTS

| | | | | |
|---|---|---|---|---|
| 3,863,379 A * | 2/1975 | Kobayashi | ............... | 43/6.5 |
| 3,903,632 A * | 9/1975 | Tison et al. | ............... | 43/6.5 |
| 3,942,655 A * | 3/1976 | Andersen | ............... | 43/8 |
| 3,956,845 A * | 5/1976 | Hunnicutt et al. | ............... | 43/6.5 |
| 3,974,923 A * | 8/1976 | Mark et al. | ............... | 43/8 |
| 3,975,854 A * | 8/1976 | Graham | ............... | 43/6.5 |
| 3,993,011 A * | 11/1976 | Garland | ............... | 414/137.7 |
| 4,028,821 A * | 6/1977 | Hanks | ............... | 43/8 |
| 4,032,113 A * | 6/1977 | Bjorshol | ............... | 43/8 |
| 4,034,693 A * | 7/1977 | Challenger | ............... | 43/100 |
| 4,092,797 A * | 6/1978 | Azurin | ............... | 43/102 |
| 4,125,955 A * | 11/1978 | Puretic | ............... | 43/8 |
| 4,140,230 A * | 2/1979 | Pearson | ............... | 414/921 |
| 4,175,347 A * | 11/1979 | Puretic | ............... | 43/6.5 |
| 4,204,354 A * | 5/1980 | Kane | ............... | 43/8 |
| 4,271,553 A * | 6/1981 | Korsvik | ............... | 114/373 |
| 4,272,904 A * | 6/1981 | Francklyn | ............... | 43/6.5 |
| 4,297,069 A * | 10/1981 | Worthington | ............... | 414/462 |
| 4,347,680 A * | 9/1982 | Kaestner | ............... | 43/8 |
| 4,365,575 A * | 12/1982 | Cicero | ............... | 43/8 |
| 4,449,315 A * | 5/1984 | Puretic | ............... | 43/8 |
| 4,554,759 A * | 11/1985 | Edling et al. | ............... | 43/100 |
| 4,624,019 A * | 11/1986 | Pennington-Richards | ... | 4/566.1 |
| 4,633,538 A * | 1/1987 | James | ............... | 4/564.1 |
| 4,663,879 A * | 5/1987 | Bergeron, Jr. | ............... | 43/6.5 |
| 4,678,446 A * | 7/1987 | Dahan | ............... | 441/80 |
| 4,684,310 A * | 8/1987 | Stange | ............... | 414/466 |
| 4,741,660 A * | 5/1988 | Kent | ............... | 414/462 |
| 4,773,887 A * | 9/1988 | Steffanus | ............... | 441/80 |
| 4,798,020 A * | 1/1989 | George et al. | ............... | 43/6.5 |
| 4,861,299 A * | 8/1989 | Ueberschaer | ............... | 441/80 |
| 4,862,997 A * | 9/1989 | Eberle | ............... | 414/921 |
| 4,894,943 A * | 1/1990 | Allen et al. | ............... | 43/11 |
| 4,941,216 A * | 7/1990 | Boublil | ............... | 414/921 |
| 4,964,358 A * | 10/1990 | Sandrow | ............... | 114/365 |
| 5,011,361 A * | 4/1991 | Peterson | ............... | 414/462 |
| 5,020,464 A * | 6/1991 | Rodrigues | ............... | 43/11 |
| 5,099,597 A * | 3/1992 | Whistle | ............... | 43/11 |
| 5,140,923 A * | 8/1992 | Wood | ............... | 414/137.7 |
| 5,245,780 A * | 9/1993 | Hansen et al. | ............... | 43/8 |
| 5,385,666 A * | 1/1995 | Perlsweig | ............... | 43/12 |
| 5,431,526 A * | 7/1995 | Peterson et al. | ............... | 414/462 |
| 5,435,766 A * | 7/1995 | Epstein | ............... | 441/80 |
| 5,553,990 A * | 9/1996 | Kytola, Sr. | ............... | 414/921 |
| 5,595,265 A * | 1/1997 | Lebrocquy | ............... | 414/921 |
| 5,628,583 A * | 5/1997 | Gibson | ............... | 114/48 |
| 5,839,131 A * | 11/1998 | Schaffer | ............... | 4/560.1 |
| 5,938,395 A * | 8/1999 | Dumont, Jr. | ............... | 414/462 |
| 5,984,613 A * | 11/1999 | Motilewa | ............... | 414/462 |
| 6,003,463 A * | 12/1999 | Giesler | ............... | 114/259 |
| 6,099,012 A * | 8/2000 | Mortimer | ............... | 414/462 |
| 6,343,433 B1 * | 2/2002 | Granberg | ............... | 43/6.5 |
| 6,361,264 B1 * | 3/2002 | Guthrie et al. | ............... | 414/462 |
| 6,386,817 B1 * | 5/2002 | Cash | ............... | 414/462 |
| 6,412,213 B1 * | 7/2002 | Wellard | ............... | 43/12 |
| 6,584,724 B1 * | 7/2003 | Le Blanc | ............... | 43/11 |
| 6,698,994 B2 * | 3/2004 | Barrett | ............... | 414/462 |
| 6,769,858 B1 * | 8/2004 | Butler et al. | ............... | 414/462 |
| 6,918,203 B2 * | 7/2005 | Robichaud | ............... | 43/8 |
| 6,953,374 B1 * | 10/2005 | Connolly | ............... | 441/80 |
| 2002/0017049 A1 * | 2/2002 | Millett et al. | ............... | 43/11 |
| 2004/0068914 A1 * | 4/2004 | Wellard et al. | ............... | 43/12 |
| 2005/0055864 A1 * | 3/2005 | Robichaud | ............... | 43/8 |
| 2006/0093462 A1 * | 5/2006 | Pradenas | ............... | 414/462 |

FOREIGN PATENT DOCUMENTS

| | | | |
|---|---|---|---|
| EP | 130665 A1 * | 1/1985 |
| FR | 2658384 A1 * | 8/1991 |
| GB | 2162469 A * | 2/1986 |
| JP | 55-106883 | 8/1980 |
| JP | 55-106883 A * | 8/1980 |
| JP | 4-88936 A * | 3/1992 |
| JP | 10-14443 A * | 1/1998 |
| JP | 10-33088 A * | 2/1998 |
| JP | 11-197368 A * | 7/1999 |
| JP | 2002-300835 A * | 10/2002 |

* cited by examiner

MECHANICAL NETTING DEVICE

This application is a continuation-in-part of U.S. patent application Ser. No. 10/890,618, entitled MECHANICAL NETTING DEVICE, filed 12 Jul. 2004 now abandoned, the disclosure of which is herein incorporated by reference in its entirety.

BACKGROUND

1. Technical Field

This disclosure relates in general to equipment used to capture and restrain objects found in the water, and in particular, to a mechanical netting device for the capture and restraint of objects found in the water.

2. Description of the Related Art

Many individuals must capture and/or restrain objects found in the water for work and/or play. Sport-fishing from a boat is one example. As opposed to commercial fishing practices that typically use very large nets or long lines to capture many fish at once, sport-fishing refers to an angler who seeks to capture and/or kill an individual fish for primarily recreational purposes.

When sport-fishing from a boat, the process of bringing a fish into the boat, or "landing" a fish, has traditionally been accomplished using three primary methods, each of which may be performed either by the angler who is playing the fish or by a companion of the angler.

The first traditional method is to physically grab the fish, either by the tail or by the mouth, using the hand or some type of pliers, and lift it inside the boat. If done by hand, this technique works well only for small fish that lack sharp teeth. If done by the angler, it requires the angler to grasp the fishing rod with one hand while using the other to handle the fish. Furthermore, fish are often played to complete exhaustion before the angler or the angler's companion attempts to land the fish, which decreases the chances of fish survival if the fish must be released for reasons such as being too small, too large, wrong species, etc. Fish that are allowed to be killed under the applicable fishing regulations are often referred to as "legal."

The second traditional method is to gaff the fish. The hook of the gaff is used to pierce the fish and lift it into the boat. If done by the angler, it requires the angler to grasp the fishing rod with one hand while using the other to handle the gaff. Obviously, gaffing should be employed only with legal fish. Ascertaining whether a fish is legal must be accomplished before the fish is gaffed, and this is sometimes difficult, especially when closely related species of fish are present in the water, e.g., there may be up to five species of salmon present in the waters off Alaska.

The third traditional method, and by far the most popular, is to net the fish using a long-handled net when the fish is close to the boat. If done by the angler, it requires the angler to grasp the fishing rod with one hand while using the other to handle the net.

In addition to the disadvantages described above, the traditional methods are becoming more inconvenient in the face of increasingly popular catch-and-release regulations that are designed to be protective of the fish. Catch-and-release regulations govern the handling of fish that are caught purely for sport, with the intent that the fish will be released back to the water.

Fish are harmed by the traditional methods of landing them in numerous ways. For example, it has been shown that lifting fish, especially larger ones, from the buoyancy provided by the water can be traumatic to the fish's internal organs. It has been shown that traditional fish net made of nylon filaments or hemp filaments can be damaging to fins and gills. It has been shown that handling fish with dry hands can damage the fish's protective slime coating, which is a barrier to infection.

In order to minimize harm to fish, some catch-and-release regulations require that the fish be played and released without ever leaving the water. For anglers who use the traditional methods of landing fish described above, this poses increased difficulty. For example, gaffing a fish is entirely incompatible with catch-and-release regulations. Grabbing a fish is still possible, but now the fish must remain in the water while the angler attempts to release the hook. Netting the fish is probably easiest, but the angler must first net the fish, put down the rod, and release the fish, all while maintaining a grip on the net.

Embodiments of the invention address these and other disadvantages of the traditional methods described above as well as other methods not described.

DETAILED DESCRIPTION

This disclosure may frequently refer to one object as being "attached" or "affixed" to another object. As will be recognized by those of ordinary skill, there exist a variety of fasteners and techniques for attaching or affixing one object to another. Since a complete description of all conventional fasteners and techniques for attaching objects to each other is not required for a thorough understanding of the inventive principles exhibited by embodiments of the invention, such a description is not provided in this disclosure.

However, other areas of this disclosure describe in detail certain particular attachments or relationships between different objects that the inventor considers to be an aspect of his invention. Thus, where this disclosure refers to one object as being "attached" to another object, it does not necessarily mean that the attachment or technique for attaching the one object to the another object is well-known in the art.

Figure 1:
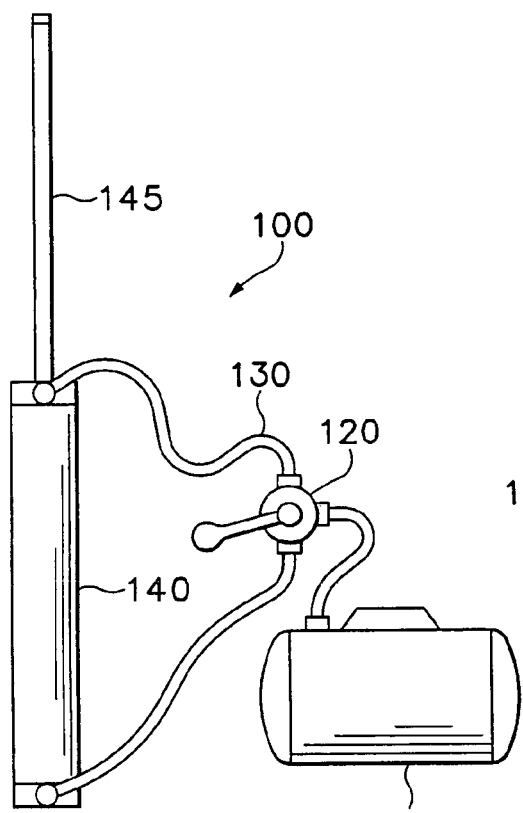
FIG. 1 is a diagram illustrating an exemplary lifting mechanism for a mechanical netting device according to some embodiments of the invention.

FIG. 1 is a diagram illustrating an exemplary lifting mechanism 100 for a mechanical netting device according to some embodiments of the invention.

Referring to FIG. 1, the lifting mechanism 100 includes a portable air tank 110, a valve 120, pneumatic tubing 130, and a pneumatic cylinder 140 that includes a cylinder rod 145.

Figure 1A:
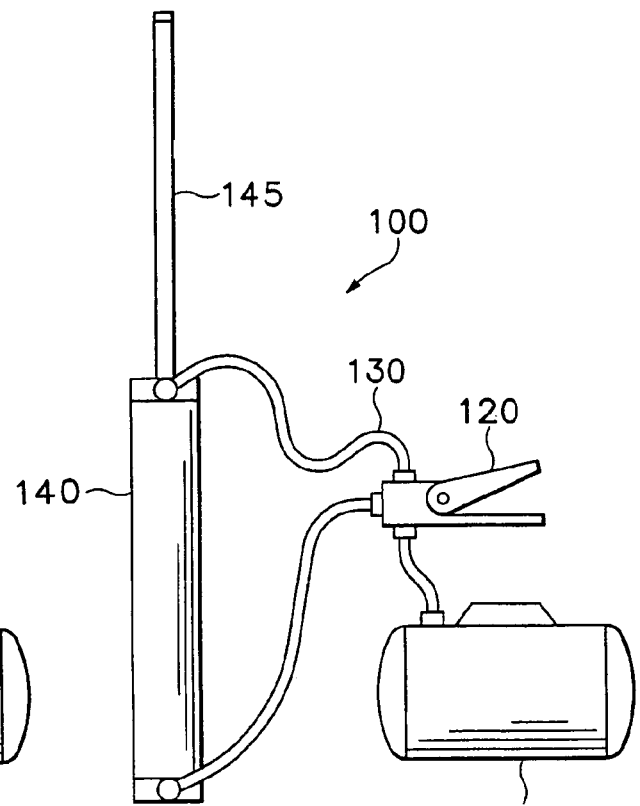

The pneumatic cylinder 140 is operated by compressed air stored in the portable air tank 110. The compressed air stored in the portable air tank 110 is selectively supplied, using the pneumatic tubing 130, to either end of the pneumatic cylinder 140 by the valve 120. As illustrated in FIG. 1A, when compressed air is supplied to one end of the pneumatic cylinder 140, the cylinder rod 145 is extended from the pneumatic cylinder. When compressed air is supplied to the other end of the pneumatic cylinder 140, the cylinder rod 145 reverts to its retracted position within the pneumatic cylinder. Because the cylinder rod 145 may be moved both outward and inward by the compressed air, the pneumatic cylinder 140 is categorized as a double-action pneumatic cylinder.

In alternative embodiments of the invention, the pneumatic cylinder 140 may be a single-action pneumatic cylinder, which can be moved pneumatically in only one direction. In single-action pneumatic cylinders, the return movement of the cylinder rod may be supplied by a spring or some other force when the air pressure is removed.

The lifting capacity of the pneumatic cylinder depends upon the size of the barrel and the air pressure used to operate it. A variety of pneumatic cylinders having different lifting capacities and stroke lengths may be obtained from numerous pneumatic cylinder manufacturers. An exemplary pneumatic cylinder that is suitable for use with some embodiments of the invention is manufactured by Schrader Bellows as Model FW 2B110521. This particular pneumatic cylinder model possesses a 48 inch stroke.

Although the lifting mechanism 100 illustrated in FIG. 1 relies upon compressed air to operate, other embodiments of the invention may utilize hydraulic or even electric lifting mechanisms, such as an electric linear actuator. However, electric lifting mechanisms are not preferred because of the wet operating environment. For example, additional waterproofing may be required for the electric circuits of these embodiments.

According to preferred embodiments of the invention, the valve 120 illustrated in FIG. 1 may be foot-operated. In other words, an angler standing in a boat with both hands otherwise occupied may use a foot to move the valve 120 to a position that causes the cylinder rod 145 to extend from the pneumatic cylinder 140. The pneumatic tubing 130 illustrated in FIG. 1 does not necessarily represent the actual length of the pneumatic tubing 130 used in embodiments of the invention. Preferably, the length of the pneumatic tubing 130 is long enough to allow the valve 120 and the portable air tank 110 to be positioned on the floor of the boat while the pneumatic cylinder 140 is positioned outside of the boat.

Figure 2:
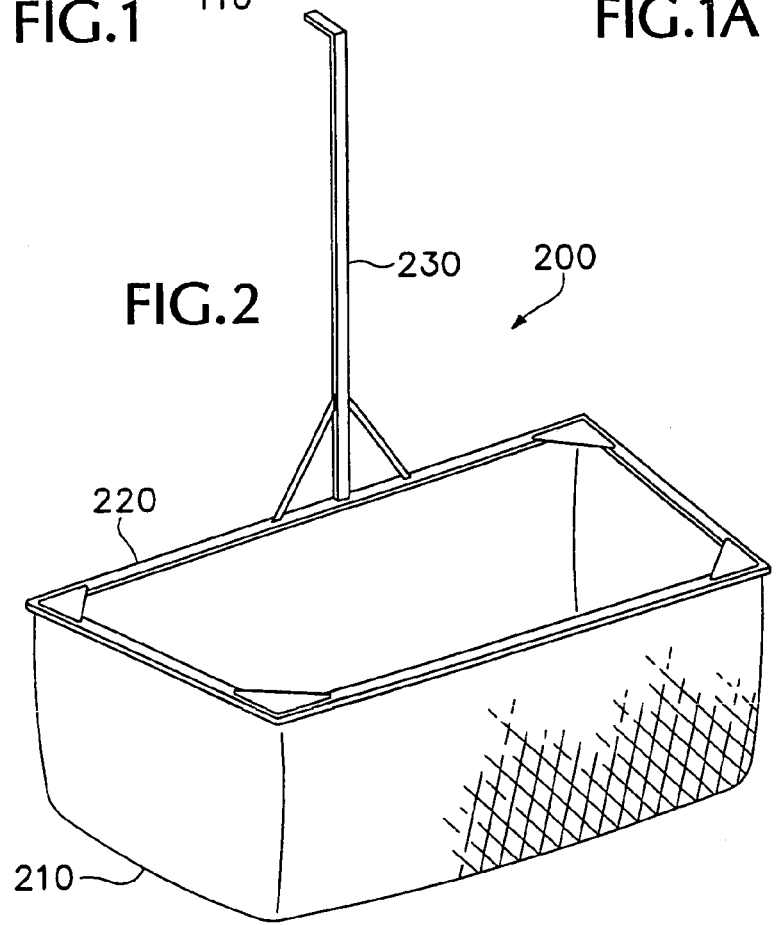
FIG. 2 is a perspective diagram illustrating an exemplary net assembly for a mechanical netting device according to some embodiments of the invention.

FIG. 2 is a perspective diagram illustrating an exemplary net assembly 200 for a mechanical netting device according to some embodiments of the invention.

Referring to FIG. 2, the net assembly 200 includes a net 210, a net support 220, and a net attachment 230. The net support 220 defines the shape and size of the opening for the net 210. Although the shape of the illustrated net support 220 is rectangular, alternative embodiments of the invention may use other shapes, such as circular shapes, oval shapes, square shapes, etc. The actual size of the illustrated net support 220, as well as the size and depth of the net 210, will depend to a large extent upon the expected size of the fish that are to be caught. The net attachment 230 is structured to connect the net support 220 to the exposed end of the cylinder rod 145 shown in FIG. 1.

Figure 3:
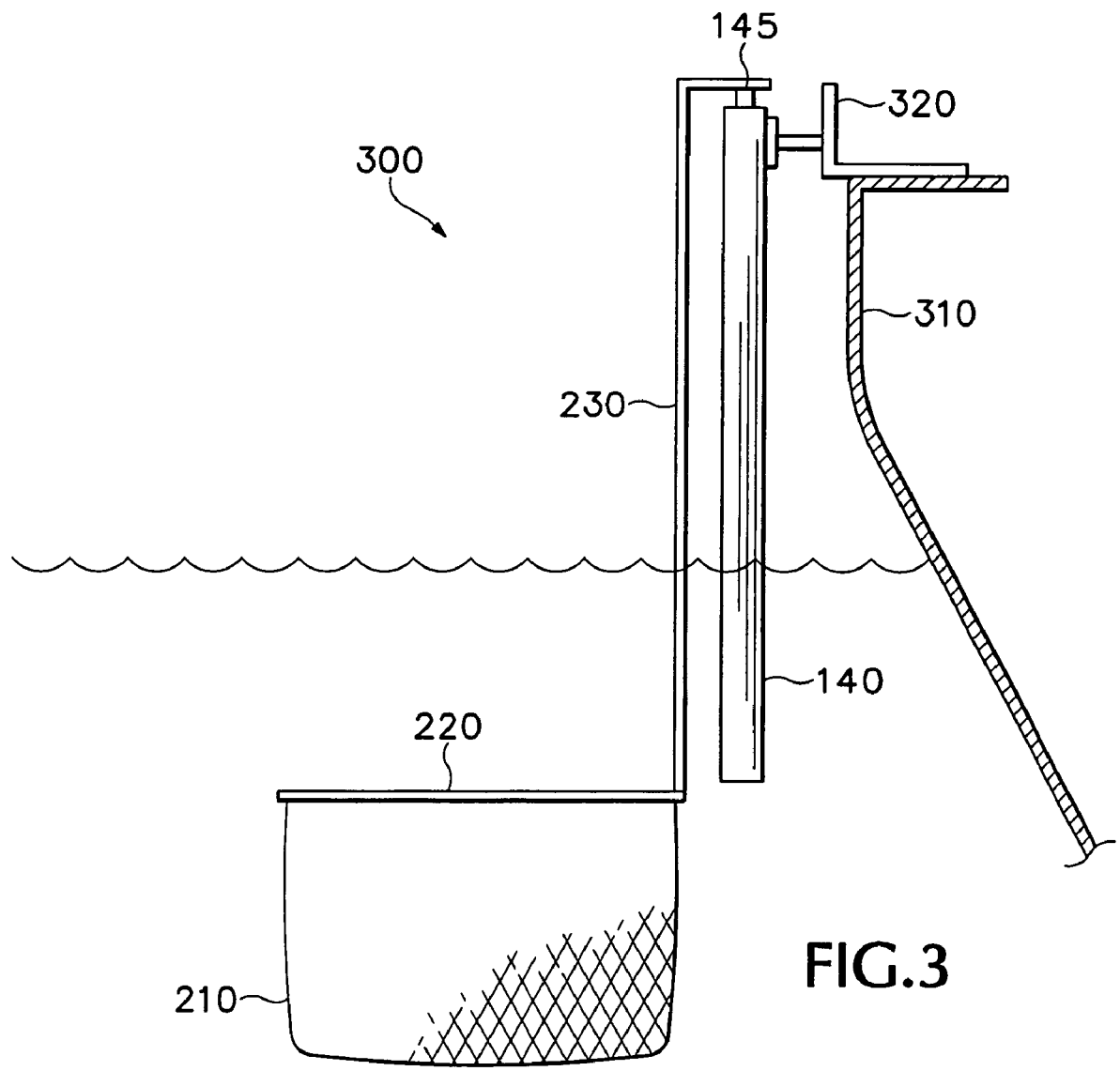
FIG. 3 is a cross-sectional diagram illustrating the operational configuration of a mechanical netting device that includes the lifting mechanism of FIG. 1 and the net assembly of FIG. 2.

FIG. 3 is a cross-sectional diagram illustrating the operational configuration of a mechanical netting device 300 that includes the lifting mechanism of FIG. 1 and the net assembly of FIG. 2. For ease of illustration, only the pneumatic cylinder 140 and the cylinder rod 145 of the lifting mechanism 100 are shown in FIG. 3.

As shown in FIG. 3, the netting device 300 also includes a boat attachment 320. Preferably, the boat attachment 320 is a clamp that allows the netting device 300 to be positioned in any suitable location on the gunnel 310 of the boat. The boat attachment 320 may also be permanently affixed to the gunnel 310, but detachably affixed to the pneumatic cylinder 140. Either option would allow the netting device 300 to be removed from the boat during transit between fishing areas, docking of the boat, etc.

As illustrated in FIG. 3, the net attachment 230 connects the net assembly 200 to the exposed end of the cylinder rod 145. In preferred embodiments of the invention, the net attachment 230 and the cylinder rod 145 are detachably affixed to each other. Furthermore, the net attachment 230 may also be detachably affixed to the net support 220, and the net 210 is preferably detachably affixed to the net support 220. That is, the cylinder rod 145, the net attachment 230, the net support 220, and the net 210 may be easily connected and disconnected to facilitate transport of the netting device 300.

An exemplary operational configuration of the netting device 300 is illustrated in FIG. 3. When the cylinder rod 145 is in the retracted position within the pneumatic cylinder 140, the net support 220 and the top of the net 210 is positioned at some distance below the waterline. Preferably, this distance is large enough to allow the angler to easily guide a hooked fish over the net, but small enough so that the chances of the fish swimming the line around the net support 220 or the net attachment 230 and breaking off is minimized.

Operation of the netting device 300 will now be described with reference to FIGS. 1, 2, and 3. Once the netting device 300 is assembled as shown in FIG. 3, a hooked fish may be led over the rectangular opening of the net support 220. After the fish is in position, the angler or another person may operate the valve 120 so that compressed air from the portable air tank 110 causes the cylinder rod 145 to quickly extend from the pneumatic cylinder 140. The movement of the cylinder rod 145 raises the net assembly 200, and the fish is netted.

Since the net assembly 200 will remain in the extended position until the valve 120 is used to lower the net assembly, the netting device 300 enables the angler or another person to use both hands to remove the hook from the fish, measure the fish, identify the fish, or whatever else is required before the fish is released or killed. Once the hook is removed from the fish, the valve 120 may be triggered to lower the net assembly 200 below the waterline and allow the fish to escape.

The highest extended position of the net assembly 200 may be determined by adding the distance that the cylinder rod 145 is displaced from the lowest initial position of the net assembly. After the cylinder rod 145 is extended, the net assembly 200 may be positioned so that the net support 220 is above the waterline but the bottom of the net 210 remains a distance below the waterline. Thus the netted fish is prevented from escaping but still remains within the water, which minimizes the harm done to the fish. Alternatively, the initial starting position of the net assembly 200 may be fixed at a point so that after the cylinder rod 145 is extended the entire net 210 is above the waterline.

According to some embodiments of the invention, the angler or another person may adjust the highest position of the net assembly 200 by fixing the initial position of the net assembly at the appropriate depth below the waterline. This may be accomplished by adjusting the position at which the boat attachment 320 connects to the pneumatic cylinder 140. For example, as shown in FIG. 3, the boat attachment 320 is shown attached near the top of the pneumatic cylinder 140. Thus, the net assembly 200 is near the limit of how deep its initial position may be set. If the boat attachment 320 was a clamp, the initial position of the net assembly 200 could be raised by clamping the pneumatic cylinder 140 at a position closer to its midpoint.

According to alternative embodiments of the invention, the maximum height achieved by the net assembly 200 could be adjusted, not by setting its initial depth at the desired position, but by limiting the distance that the cylinder rod 145 is displaced from the retracted position within the pneumatic cylinder 140.

It should be apparent that some embodiments of the invention will have different physical dimensions and shapes compared to other embodiments depending on the size of the boat, and the size of the fish that are expected to be caught. For example, boats that have a larger average distance between the waterline and the tops of the gunnels may require a longer pneumatic cylinder than those boats having a smaller average distance between the waterline and the tops of the gunnels. As another example, the size of the pneumatic cylinder may also vary depending on the average size of the fish that are expected to be caught. A 45 pound Chinook salmon would require a larger pneumatic cylinder than an 8 pound trout.

Alternatively, some embodiments of the invention may accommodate larger fish by using more than one pneumatic cylinder. For example, the net assembly 200 illustrated in FIG. 2 has only one net attachment 230. Some embodiments of the invention may have a net assembly with two net attachments 230, each net attachment connected to a corresponding pneumatic cylinder 140. In this case, the valve 120 of FIG. 1 may be structured to supply air simultaneously to both of the pneumatic cylinders.

Embodiments of the invention, such as those described above, allow an angler or another person to unhook, measure, identify, or otherwise inspect the fish for legality while the fish remains entirely or partially in the water, thus minimizing the harm done to the fish. Embodiments of the invention also enable an angler to net a fish by himself or herself, without help from other persons, and without requiring the angler to remove a hand from the fishing rod. The angler or another person may also unhook, measure, identify, or otherwise inspect the fish for legality without having to place the fish inside the boat, and without having to use one hand to maintain control of the net. Thus, the amount of additional water and fish slime introduced inside the interior of the boat is minimized, increasing the safety of those standing or sitting inside the boat.

Furthermore, embodiments of the invention are capable of lifting even very heavy fish to a point where it becomes easier for a person to transfer the fish to the boat. According to some embodiments of the invention the net attachment 230 may be structured to swivel about an axis that passes longitudinally through the center of the cylinder rod 145. Thus, the net assembly 200 and net 210 may be extended from the water, rotated to a point over the inside of the boat, and then lowered again. This movement of the mechanical netting device 300 would allow a person to lift and lower even very heavy fish into the boat with very little effort.

Although the embodiments of the invention described above were illustrated in the context of sport-fishing from a boat, other embodiments could easily be attached to a fixed structure such as a boat dock or a pier. This would allow anglers fishing from shore, and especially handicapped anglers, to more easily catch and release and/or catch and kill their limit of fish.

Embodiments of the invention are also not strictly limited to sport-fishing applications. For example, embodiments of the invention may be useful for those who work with other aquatic species, such as whales, dolphins, alligators, etc. As another example, embodiments of the invention may be useful in search and rescue operations to help retrieve people from the water.

As yet another example, embodiments of the invention may be installed so that people who fall overboard on large boats could accomplish a self-rescue, i.e., the lifting mechanism may be configured to be activated by a person who is treading water adjacent to the gunnel of the boat. Embodiments of this type may be especially useful aboard cruise ships and commercial fishing vessels.

Figure 4:
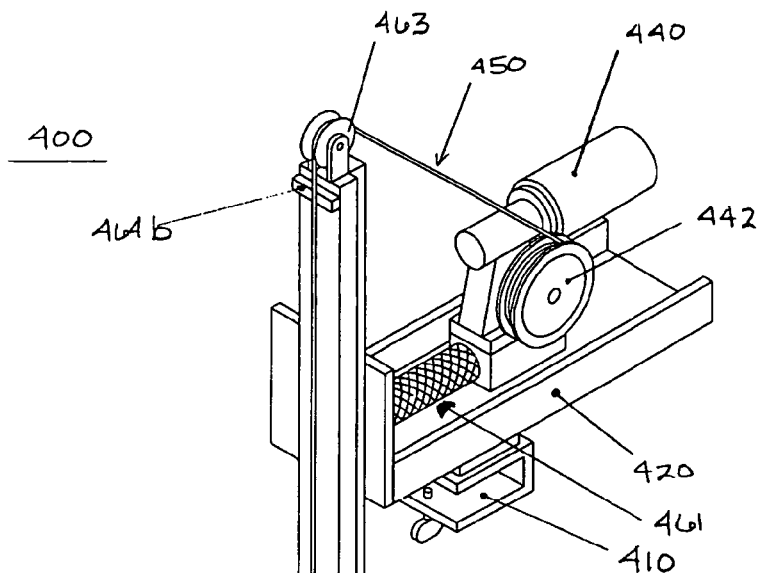
FIG. 4 is a perspective diagram illustrating a mechanical netting device according to some other embodiments of the invention.
Figure 4:
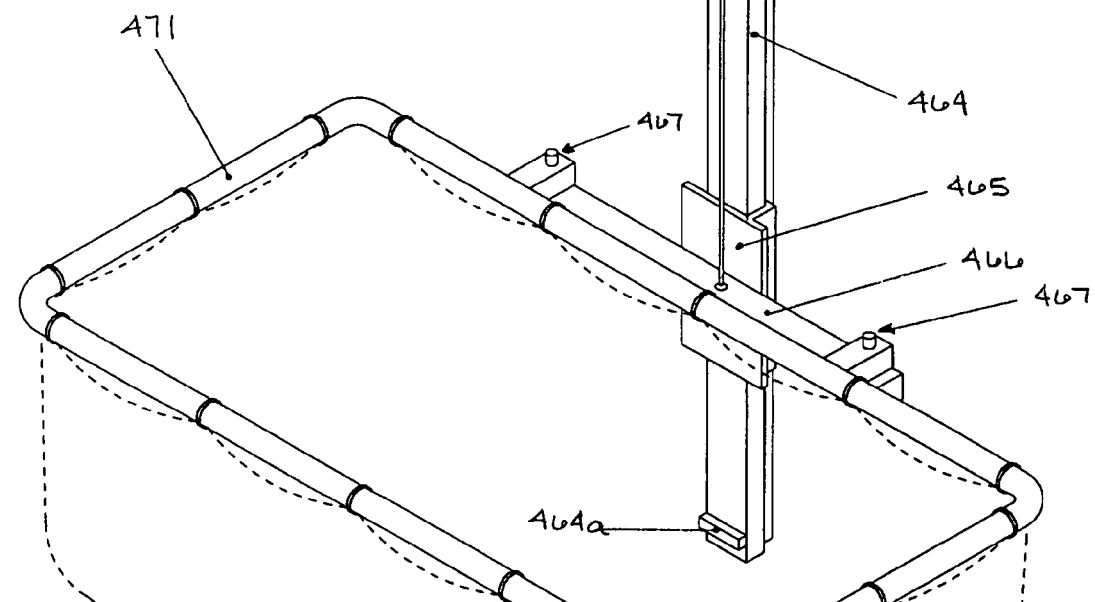
Figure 5:
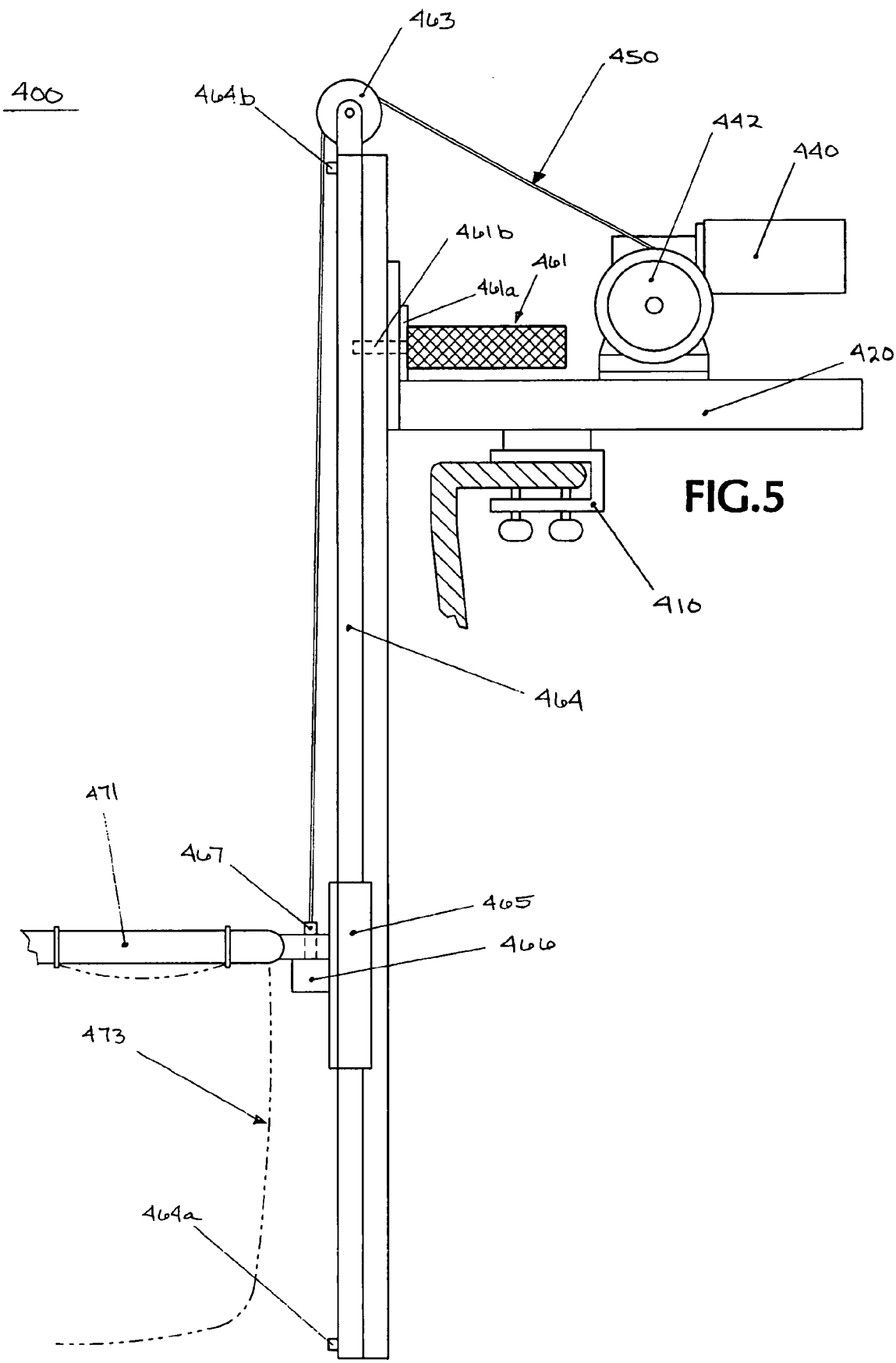
FIGS. 5 and 6 are profile diagrams further illustrating the mechanical netting device of FIG. 4.
Figure 6:
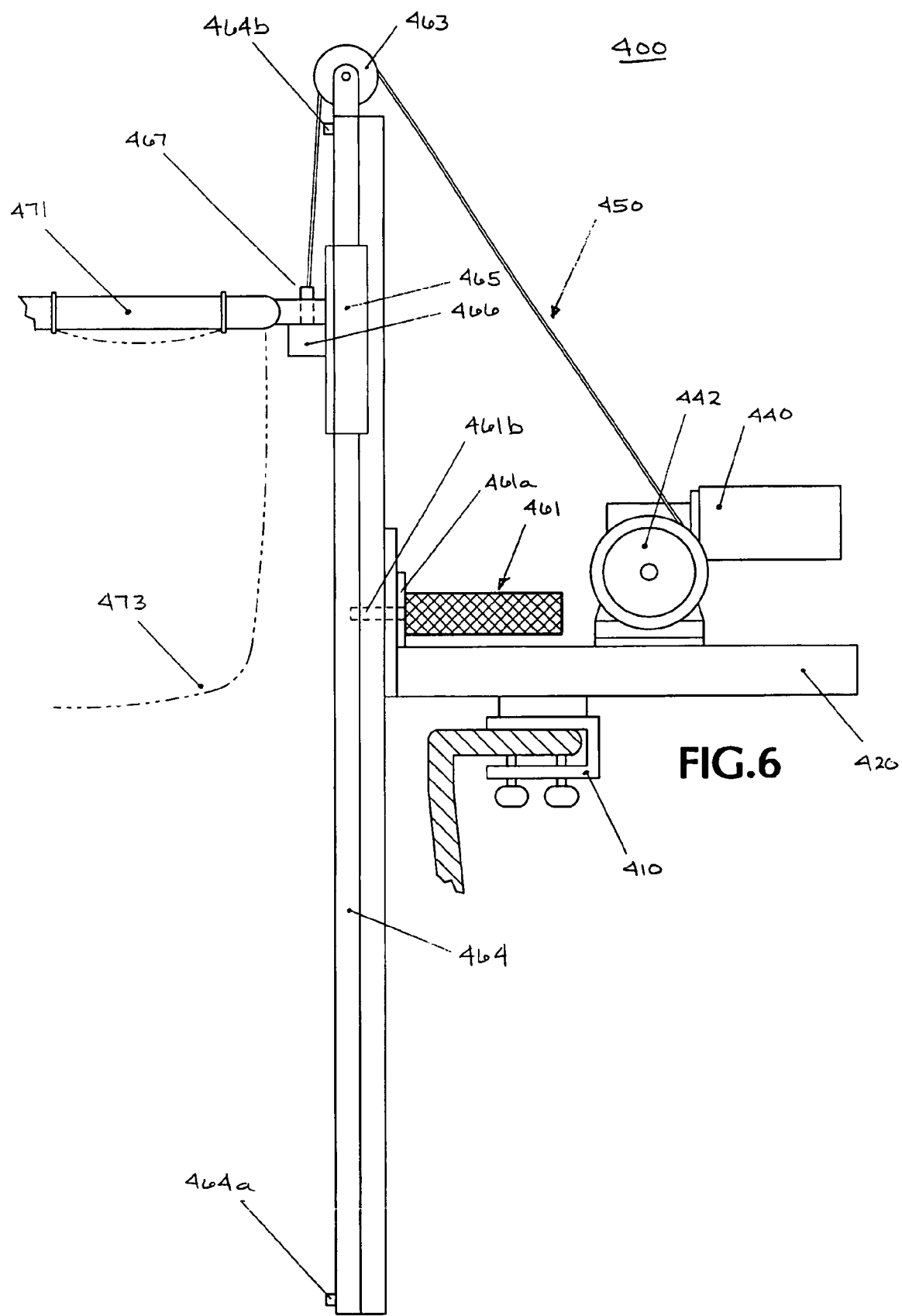
Figure 7:
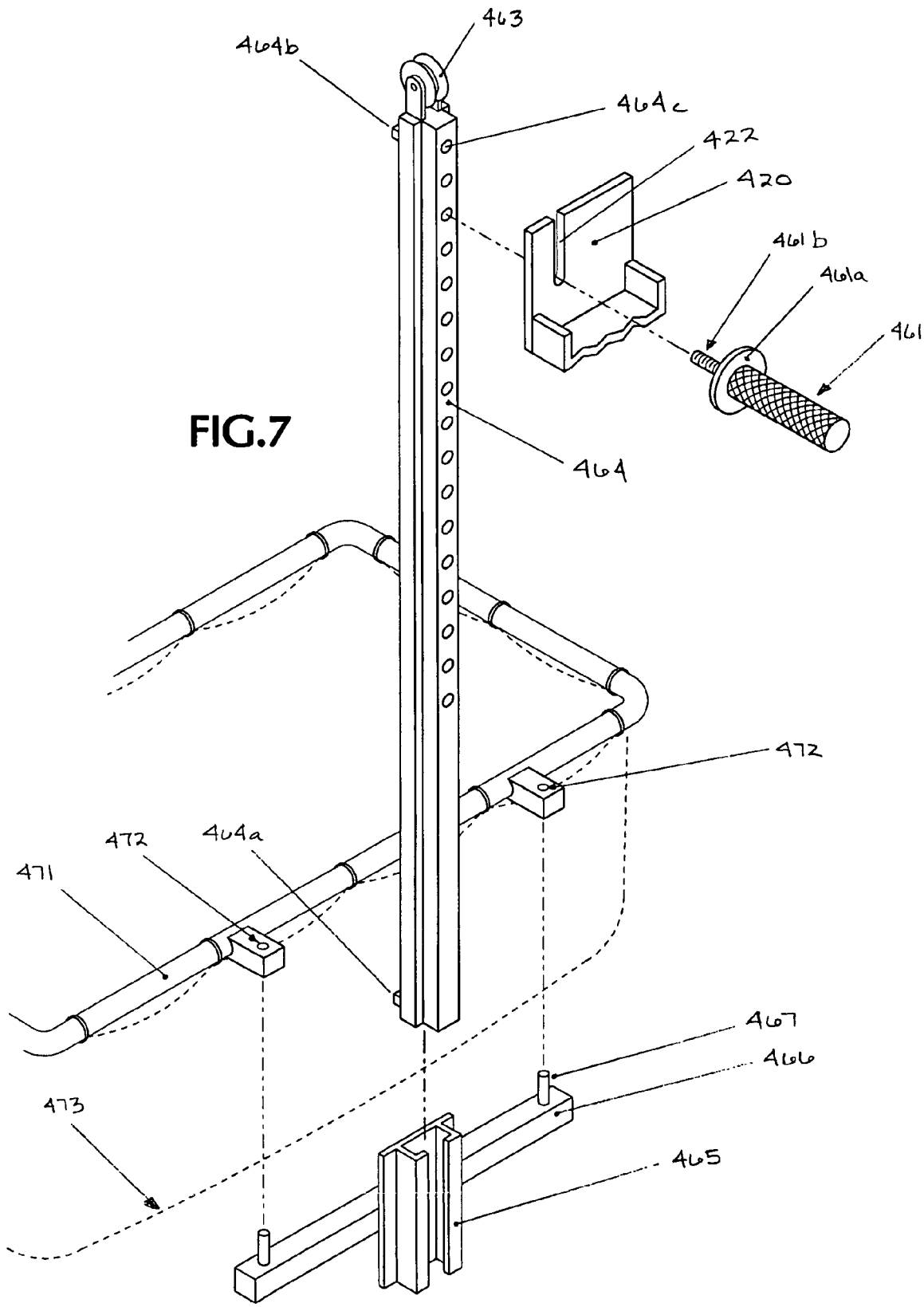
FIG. 7 is a combination perspective/exploded view diagram illustrating how some of the components of the mechanical netting device of FIG. 4 fit together.

FIG. 4 is a perspective diagram illustrating a mechanical netting device according to some other embodiments of the invention. FIGS. 5 and 6 are profile diagrams further illustrating the mechanical netting device of FIG. 4. FIG. 7 is a combination perspective and exploded view diagram illustrating how some of the components of the mechanical netting device of FIG. 4 fit together.

Referring to FIGS. 4-7, the components of the mechanical netting device 400 include a mount 410, a bracket 420, a motor 440, and a cable 450. According to some other embodiments of the invention, the mechanical netting may include a motor shield (not shown) that is structured to enclose the motor 440 and protect it from the elements.

The mechanical netting device also includes a handle 461, a pulley 463, a guide bar 464, a net carriage 465, a net attachment bar 466, and pins 467. For convenience, the components listed in the immediately preceding sentence may be referred to as a slide assembly. According to the illustrated embodiments, the handle 461 further includes a stop 461*a* and a threaded portion 461*b*. According to the illustrated embodiments, the guide bar 464 further includes a lower stop 464*a*, an upper stop 464*b*, and threaded holes 464*c*.

The mechanical netting device also includes a net frame 471 and a net 473, where the net frame has holes 472 in the net frame. For convenience, the components listed in the immediately preceding sentence may be referred to as a net assembly.

In the illustrated embodiments, the motor 440 is representative of Baldor Industrial Motor Ser. No. B0602026007, a 12-volt, ⅓ horsepower motor that is manufactured by Baldor Electric Co. of Fort Smith, Ark. The motor 440 includes a motor pulley 442, and is powered by a 12-volt battery (not shown). The motor 440 and motor pulley 442 are operative to extend and/or retract the cable 450. It should be apparent that alternative embodiments of the invention may use a wide variety of commercially available motors depending on the estimated maximum mass of the objects that are to be lifted from the water.

The motor 440 will typically have one or more controllers (not shown) that are configured to control the operation of the motor. For example, a controller typically includes one or more buttons, knobs, switches, joysticks, or the like that can be used to control the operation of the motor 440. The controller may be connected directly to the motor 440, or it may be physically separated from the motor 440 but connected to it by an umbilical cable that may include power and control cables. The controller may be structured to be manipulated with the hand, but in some embodiments the controller may be structured to be manipulated by the foot.

For example, the controller may be designed to lay flat on the floor of a boat so that it may be manipulated by a person's foot. As was mentioned above, the controller may also be mounted on an exterior of the hull or may otherwise be accessible by someone outside the boat.

In the illustrated embodiments, the mount 410 is a gunnel clamp mount, which is structured to clamp to the side, or gunnel, of a boat (a boat's gunnel is shown in cross-section in FIGS. 5 and 6, clamped between the mount 410). Alternative embodiments of the invention may use other types of mounts, such as a turntable mount or a swivel mount that are also designed to be attached to the gunnel of a boat. Of course, other embodiments of the invention may be designed to be affixed to other structures, such as a dock or pier, and in these cases the type of mount that is used will depend on the particular structure. When the mount 410 is clamped to the gunnel of the boat, it is structured to support the entire weight of the bracket 420 and the other components that are attached to the bracket.

In the illustrated embodiments, the bracket 420 has a generally L-shaped structure. The horizontally arranged portion of the bracket 420, representing the long side of the L, is structured to attach to the top of the mount 410, and is also structured to be attached to the motor 440, which is arranged on top of the horizontally arranged portion of the bracket.

As illustrated in FIG. 7, the vertically arranged portion of the bracket 420, representing the short side of the L, has a slot 422 that is arranged in the vertical direction. The slot 422 is used to detachably affix the slide assembly to the bracket 420, which will be explained in further detail below.

In the following paragraphs, a more detailed description of the slide assembly is presented.

Referring to FIG. 7, it can be seen that a horizontal cross-section of the guide bar 464 is substantially T-shaped. The horizontal cross-section of the net carriage 465 is shaped so that a recess defined by the net carriage matches and surrounds the upper part of the T-shaped portion of the guide bar 464. The dimensions of the recess in the net carriage 465 are preferably slightly larger than the upper portion of the T-shaped horizontal cross-section of the guide bar 464. Thus, when the recess of the net-carriage 465 is engaged around the upper part of the T-shaped horizontal cross-section of the guide bar 464, the net carriage may move only in a linear direction along an axis that is parallel to a length of the guide bar.

Generally speaking, embodiments of the invention may use any horizontal cross-sectional shape for the guide bar 464 and the net carriage 465, as long as one or more protrusions on the horizontal cross-section of either the guide bar or net carriage is matched to one or more corresponding indentations on the other one of the guide bar or net carriage. When the protrusion or protrusions on one of the guide bar 464 or net carriage 465 is cooperatively engaged by or positioned within the corresponding indentation or indentations on the other one of the guide bar or net carriage, the horizontal cross-sectional shape of the guide bar and net carriage allow relative movement between the guide bar and net carriage in a linear direction along an axis that is parallel to a length of the guide bar, while restricting relative movement between the guide bar and the net carriage in directions that are perpendicular to the axis that is parallel to the length of the guide bar. Henceforth, the term "conjugate" or "conjugate relationship" refers to the relationship between the guide bar 464 and the net carriage 465 as described in this paragraph.

In the illustrated embodiments, the lower end of the guide bar 464 has a lower stop 464a that limits the downward movement of the net carriage 465 and prevents the net carriage from sliding off the end of the guide bar. The upper end of the guide bar 464 has an upper stop 464b that is similar to the lower stop 464a. The upper stop limits the upward movement of the net carriage 465. Preferably, one or more of the lower and upper stops 464a, 464b may be detachably affixed to the guide bar 464, therefore allowing the net carriage 465 to be easily removed from the guide bar 464 for ease of storage, repair, or replacement. In alternative embodiments of the invention, the lower stop and upper stop 464a, 464b may protrude from more than one surface of the guide bar 464.

In the illustrated embodiments, the slide assembly further includes a pulley 463, which is located at the top of the guide bar 464. The pulley 463 works cooperatively with the cable 450 to guide the cable over the top of the guide bar 464 when the cable is extended or retracted by the motor 440. Preferably, the pulley 463 is detachably affixed to the top of the guide bar 464, therefore allowing the pulley to be easily removed from the guide bar 464 for ease of storage, repair, or replacement.

The slide assembly also includes a net attachment bar 466 having pins 467. The net attachment bar 466 is attached to the side of the net carriage 465 that is opposite the guide bar 464. Preferably, the net attachment bar 466 is arranged in a direction that is substantially perpendicular to the length of the guide bar 464, as illustrated in FIGS. 4 and 7. However, other shapes and arrangements for the net attachment bar 466 are possible. Functionally speaking, the net attachment bar 466 and pins 467 are structured to attach the net assembly to the guide bar 464 and to provide support for the net assembly and objects that are held by the net assembly. This attachment is described in greater detail below.

As shown in FIG. 4, an end of the cable 450 passes through a small hole in the center of the net attachment bar 466. A metal sleeve (not shown) may be crimped around the end of the cable 450, and the diameter of the metal sleeve prevents the end of the cable from sliding back through the hole in the net attachment bar 466. In preferred embodiments, the end of the cable 450 is attached to the net attachment bar 466 using a technique that allows the cable to be quickly and easily connected and disconnected from the net attachment bar. For example, the end of the cable 450 may be attached to a hook or a latch using known techniques, and the hook or latch could then be used to connect the cable to a corresponding eye-bolt affixed to the net attachment bar 466.

In alternative embodiments of the invention, the cable 450 may be attached to the net carriage 465 using methods that are well-known in the art. For example, there may be one or more holes disposed in an upper portion of the net carriage 465, and these holes may be used to attach the end of the cable 450 to the net carriage.

Many other ways of connecting and disconnecting the cable to the net attachment bar 466 or the net carriage 465 will be apparent to those of skill in the art but a complete description of all possible arrangements is not necessary to understand the inventive principles of the illustrated embodiments.

The slide assembly further includes a handle 461, which is structured to provide an attachment for the slide assembly to the bracket 420. Preferably, the surface of the handle 461 is knurled to provide a better grip. As illustrated in FIG. 7, the handle 461 is generally cylindrical in shape and includes a stop 461a and a threaded portion 461b. In alternative embodiments of the invention, the handle 461 may not have the stop 461a. The threaded portion 461b of the handle 461 is structured to be threadably inserted inside one of the threaded holes 464c that is located along the length of the guide bar 464.

Preferably, as illustrated in FIG. 7, the threaded holes 464c are spaced uniformly along the length of the guide bar 464. When the handle 461 is inserted within the uppermost threaded hole 464c, the lower stop 464a of the guide bar 464 is at its furthest position from the bracket 420. When the handle 461 is inserted within the lowermost threaded hole 464c, the lower stop of the guide bar 464 is at its closest position to the bracket 420. Thus, by selecting the appropriate threaded hole 464c for attaching the handle 461, the mechanical netting device 400 may be adjusted so that the net assembly reaches a maximum depth beneath the water that is selected according to the preferences of the user of the mechanical netting device. Of course, other embodiments of the invention may not have a handle, and the guide bar 464 may be permanently attached to the bracket 420.

With the handle 461 attached to the guide bar 464, the handle may be lowered into the vertical slot 422 on the bracket 420 (as seen in FIG. 7), thus supporting the weight of the slide assembly and net assembly. In this position, the weight of the slide assembly prevents the handle 461 from moving vertically upwards and out of the slot 422. Simultaneously, the stop 461a, which has a diameter that is larger than a width of the slot 422, prevents the handle 461 from moving horizontally sideways and out of the slot 422. Consequently, the slide assembly 460 is held securely on the bracket 420, yet still may be quickly and easily removed, for example, by a person grasping the handle and lifting the slide assembly 460 vertically upwards and out of the slot 422.

As a consequence of the slide assembly being configured for quick and easy removal from the bracket 420, the illustrated embodiments are not rigidly affixed to the bracket 420 by the handle 461, and the slide assembly may exhibit a pendulum-like motion relative to the bracket when the net assembly is attached to the slide assembly and deployed in the water. In shallow water situations when the possibility of striking objects beneath the water is increased, this motion may be beneficial because the impact of a collision may be transferred into movement of the slide assembly relative to the bracket 420, rather than potentially damaging the mechanical netting device and/or the boat.

In alternative embodiments of the invention, the handle 461 may rigidly affix the slide assembly to the bracket 420. For example, a pin may be located on the outer surface of the bracket 420, just beneath the vertical slot 422. The pin is not threaded, but has a diameter small enough so that it may fit within one of the threaded holes 464c. Thus, when the handle 461 is threadably inserted into a first threaded hole 464c, the pin on the bracket 420 engages the second threaded hole 464c that is positioned below the first threaded hole on the guide bar 464. With the pin in place inside the second threaded hole 464c, the slide assembly would be prevented from rotating around the pivot point created by the threaded portion 461b of the handle 461 as it rests at the bottom of the vertical slot 422.

According to alternative embodiments of the invention, the slide assembly may further include a bracket plate (not shown) that is disposed between the guide bar 464 and the bracket 420. In this case, the threaded portion 461b of the handle 461 is structured to be inserted through a hole in the bracket plate prior to being threadably inserted into one of the threaded holes 464c of the guide bar 464. Thus, the handle 461 also attaches the bracket plate 462 to the guide bar 464. The presence of a bracket plate provides a buffer between the guide bar 464 and the bracket 420, preventing them from contacting each other directly and possibly causing excessive wear. The bracket plate may include a metal or a plastic material.

In the following paragraphs, a more detailed description of the net assembly is presented.

As shown in FIGS. 4-7, the net frame 471 is used to maintain the net opening of the net 473 in a fixed position. Although only a very basic outline of the net 473 is illustrated in FIGS. 4-7, it should be apparent to those of skill in the art that a real net would have many more interleaved filaments to prevent objects within the net from escaping. As shown in FIGS. 4-7, the net 473 may be attached to the net frame 471 using connectors. According to alternative embodiments of the invention, the net frame 471 may be formed of two or more detachable parts, which would allow ends of the net frame to be slid between the mesh of the net and eliminate the need for connectors.

Although the net frame 471 as illustrated in FIG. 7 is substantially rectangular in shape, in alternative embodiments of the invention other shapes may just as easily be used.

The holes 472 (see FIG. 7) in the net frame 471 correspond to the two pins 467 on the net attachment bar 466 of the slide assembly 460. When the pins 467 are inserted through the holes 472, the net assembly 470 is attached to the slide assembly 460 and supported by the net attachment bar 466. In alternative embodiments of the invention, the pins 467 on the net attachment bar 466 may be clevis pins, ring pins, lynch pins, or cotter pins, each of which would prevent the net frame 471 from detaching from the net attachment bar 466, yet still allow a user to release the net frame from the net attachment bar relatively easily. In still other embodiments of the invention, the pins 467 may be replaced by threaded bolts, allowing the net frame 471 to be attached to the net attachment bar 466 using threaded nuts.

Two operational positions of net assembly on the mechanical netting device 400 are represented in FIGS. 5 and 6. Both of the positions illustrated in FIGS. 5 and 6 are positions between the vertically highest position and the vertically lowest position, which are determined by the location of the stops 464a and 464b. As is illustrated in FIGS. 5 and 6, the net frame 471 is maintained substantially perpendicular to the guide bar 464 throughout the range of motion of the net frame 471.

After the net assembly and the slide assembly are attached to the bracket 420 in the manner described above, the motor 440 can be controlled to move the net assembly to any desired position on the guide bar 464. In the sport-fishing scenario, a fish may be maneuvered over the opening of the net frame 471, and the motor 440 may then be controlled to lift the net frame above the surface of the water by a desired amount. Depending on the height of the net frame 471 above the water surface and the depth of the net 473, the fish may be lifted completely out of the water or it may be contained below the surface of the water, within the confines of the net 473.

According to alternative embodiments of the invention, the embodiments of FIGS. 4-7 can be modified to accommodate very heavy and/or very long objects by using a single net frame and net but using two or more slide assemblies and motors that are structured to attach to the net frame in the manner that was described above.

Although the specification may refer to "an", "one", "another", or "some" embodiment(s) in several locations, this does not necessarily mean that each such reference is to the same embodiment(s), or that the feature only applies to a single embodiment.

A person skilled in the art will be able to practice the present method in view of the description present in this document, which is to be taken as a whole. While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and sub-combinations of the various elements, features, functions and/or properties disclosed herein.

The preceding embodiments are exemplary. Those of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Having described and illustrated the principles of the invention in the exemplary embodiments, it should be apparent that the embodiments described above can be modified in arrangement and detail without departing from such principles. I claim all modifications and variation encompassed by the spirit and scope of the following claims.

The invention claimed is:

1. A motor-driven mechanical netting device, the device comprising:
   a net assembly, the net assembly including a net;
   a slide assembly structured to support the net assembly, the slide assembly including a guide bar and a net carriage, the net carriage and the guide bar having a conjugate relationship, where the net carriage and the guide bar are structured to restrict movement of the net carriage relative to the guide bar to linear movement along an axis that is parallel to the length of the guide bar;
   a bracket structured to support the net assembly, the slide assembly, and a motor; and
   a mount structured to support the bracket,
   where the slide assembly further comprises a handle having a threaded portion, the threaded portion of the handle configured to be attached to a threaded hole in the guide bar,
   where the bracket includes a vertically arranged slot, the vertically arranged slot configured to support the handle of the slide assembly, and
   where the guide bar comprises threaded holes, the threaded holes including the threaded hole, the threaded holes arranged in a line running lengthwise along a surface of the guide bar.

2. The device of claim 1, the slide assembly further comprising a first stop that is affixed to the guide bar, the first stop structured to limit the movement of the net carriage along the axis in a first direction.

3. The device of claim 2, the slide assembly further comprising a second stop that is affixed to the guide bar, the second stop structured to limit the movement of the net carriage along the axis in a second direction, the second direction opposite the first direction.

4. The device of claim 3, the first stop detachably affixed to the guide bar.

5. The device of claim 4, the slide assembly further comprising a pulley affixed to the guide bar.

6. The device of claim 5, the pulley detachably affixed to a top of the guide bar.

7. The device of claim 6, the vertically-arranged slot structured such that the slide assembly may be lifted vertically upwards and out of the bracket using the handle.

8. The device of claim 7, the net assembly comprising a net frame, the net frame defining an opening for a net, the opening in a plane that is substantially perpendicular to the axis that is parallel to the length of the guide bar.

9. The device of claim 8, the net assembly detachably affixed to the slide assembly.

10. An apparatus, comprising:
    a net assembly, the net assembly including:
        a net; and
        a net frame;
    a slide assembly structured to support the net assembly, the slide assembly including:
        a guide bar;
        a net carriage; and
        a pulley;
    a motor;
    a cable connecting the motor to the net carriage;
    a bracket structured to support the net assembly, the slide assembly, and the motor; and
    a mount structured to support the bracket.

11. The apparatus of claim 10, the mount configured to clamp to a boat.

12. The apparatus of claim 10, the mount configured to clamp to one of a dock and a pier.

13. The apparatus of claim 10, the mount including one of a turntable mount and a swivel mount.

14. The apparatus of claim 10, further comprising a controller for controlling the motor.

15. The apparatus of claim 14, the controller configured to be manipulated by a foot.

16. The apparatus of claim 10, the net carriage detachably affixed to the guide bar.

17. The apparatus of claim 10, the slide assembly detachably affixed to the bracket.

* * * * *